Sept. 15, 1925.　　　　　　　　　　　　　　　　　　1,553,731
H. E. WANER
METHOD AND APPARATUS FOR MAKING CONTAINERS FROM PLASTIC MATERIAL
Filed March 16, 1922　　　　2 Sheets-Sheet 1

Inventor
Harry E. Waner
By Robert M. Pierson
Atty.

Sept. 15, 1925.  1,553,731
H. E. WANER
METHOD AND APPARATUS FOR MAKING CONTAINERS FROM PLASTIC MATERIAL
Filed March 16, 1922   2 Sheets-Sheet 2
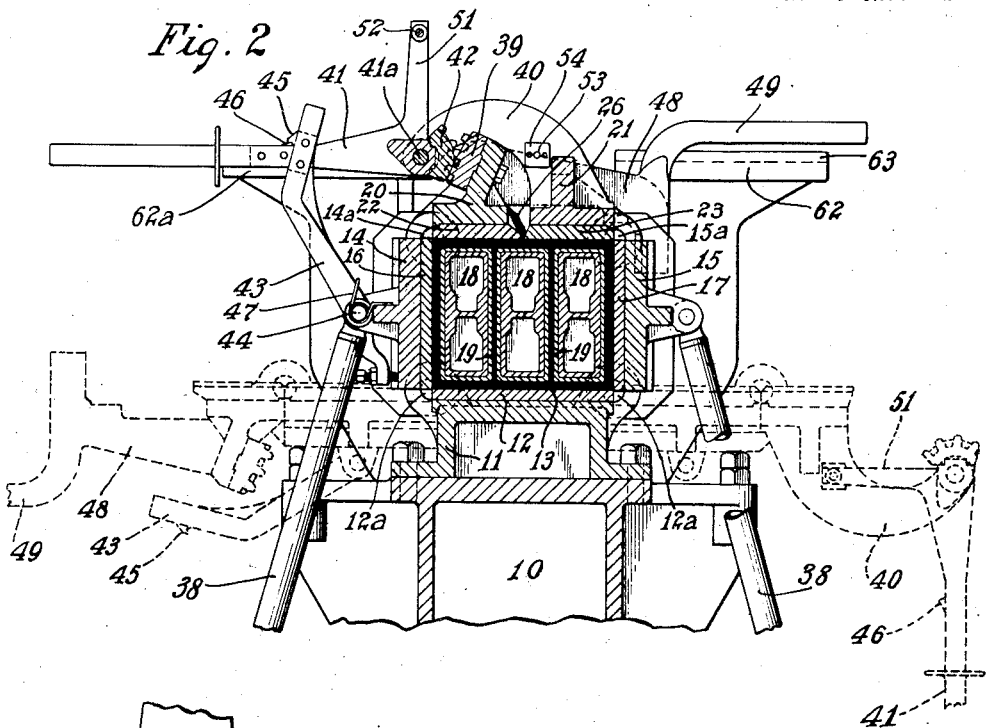
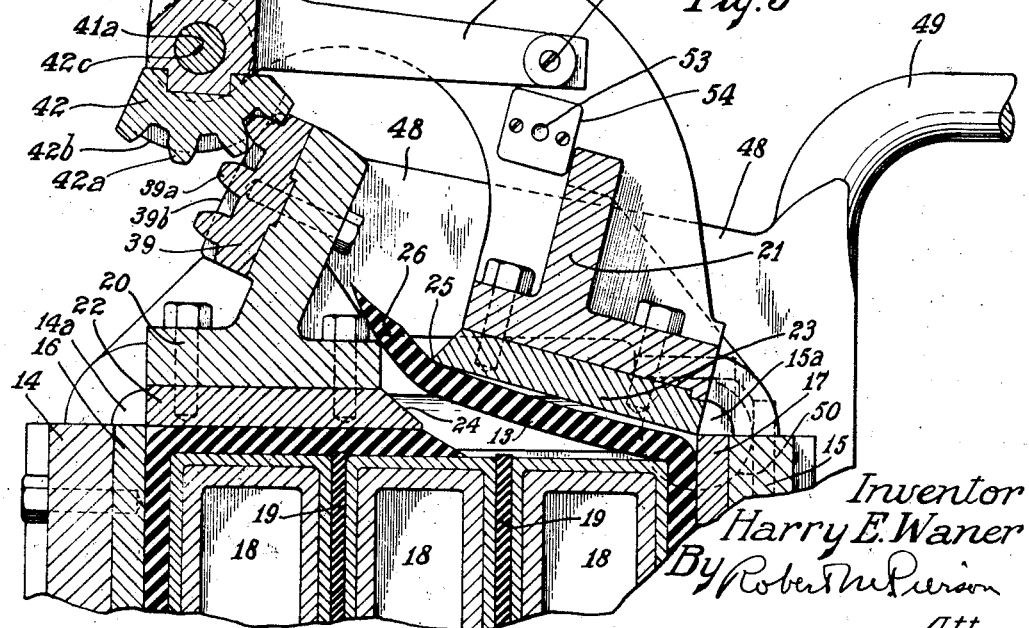
Inventor
Harry E. Waner
By Robert McPierson
Atty.

Patented Sept. 15, 1925.

1,553,731

UNITED STATES PATENT OFFICE.

HARRY E. WANER, OF AKRON, OHIO, ASSIGNOR TO THE B. F. GOODRICH COMPANY, OF NEW YORK, N. Y., A CORPORATION OF NEW YORK.

METHOD AND APPARATUS FOR MAKING CONTAINERS FROM PLASTIC MATERIAL.

Application filed March 16, 1922. Serial No. 544,212.

*To all whom it may concern:*

Be it known that I, HARRY E. WANER, a citizen of the United States, residing at Akron, in the county of Summit and State of Ohio, have invented a certain new and useful Method and Apparatus for Making Containers from Plastic Material, of which the following is a specification.

This invention relates to methods and apparatus for making containers from plastic material such as a vulcanizable rubber composition, an example being the manufacture of storage-battery jars, wherein the jar is built, of separate sheets of stock, upon one or more mandrels and subjected to molding pressure to unite the seams.

Heretofore, so far as I am aware, no successful machine has been devised for forming a multiple-celled jar by uniting, in a single pressing operation apart from the vulcanizer, the outer-wall-forming and partition-forming sheets of stock, so that the jar may be vulcanized without a mold.

My general object is to provide an improved method and improved apparatus for forming containers whereby successive containers may rapidly be formed and strong molding pressure may be applied thereto with a minimum of labor. A further and more specific object is to provide an improved method whereby outer vulcanizing molds may be dispensed with in the manufacture of multiple-celled containers and an improved apparatus for assembling and pressing a multiple-celled container upon a set of mandrels adapted to mold the interiors of its respective cells, so that the container subsequently, if desired, may be vulcanized without a mold, as in the open steam method, without weakness of the seams resulting.

Of the accompanying drawings:

Fig. 2 is a section on line 2—2 of Fig. 1, the folding and pressing members being in closed position.

Fig. 3 is a similar sectional view, on a larger scale, of the upper portion of the apparatus, showing the folding and pressing members in the folding action.

Figure 1:
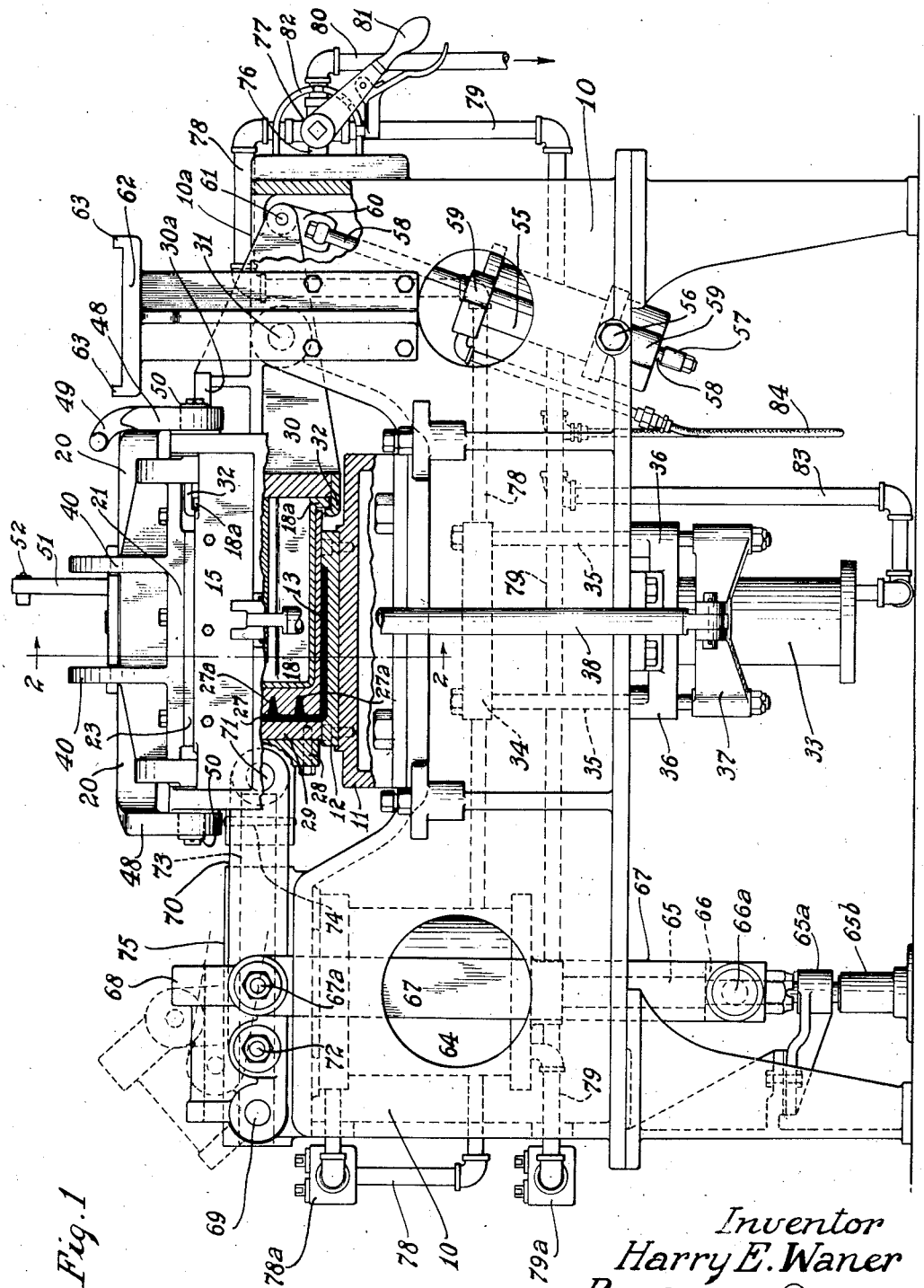
Fig. 1 is a side elevation, with parts broken away and in section, of an apparatus embodying a preferred form of my invention.

Referring to the drawings, 10 represents generally a frame upon which is mounted a base member 11 supporting a horizontal, lower mold member 12 adapted to mold an outer, side face of a battery jar whose side walls are formed from a sheet of stock 13 laid on said lower mold member. Hinged at $12^a, 12^a$, to the sides of the base member 11 are members 14, 15 faced by plates 16, 17 respectively, said plates being adapted, as the members 14, 15 are turned upon their hinges, to fold and press said sheet of side wall stock 13 against the vertical side faces of a set of mandrels, 18, 18, assembled alternately with partition forming sheets of stock 19, 19. Hinged at $14^a, 15^a$, to the members 14, 15 respectively are terminal folding and pressing members 20, 21 faced respectively by plates 22, 23, and adapted to fold and press the respective end portions of the sheet 13 onto the upper face of the mandrels 18 and by their pressure to join said end portions in a seam on said face. The plate 22 is preferably beveled along its edge adjacent the seam, as shown clearly at 24 (Fig. 3), to permit the free passage of the hinged plate 23, and the latter terminates in a cutting edge 25, preferably beveled, as shown, said edge being adapted to coact with the adjacent edge of the plate 22 in a shearing action to sever excess stock 26 from the sheet 13 as said plate 23 is forced home past the plate 22, as clearly shown in Figs. 3 and 2.

For pressing the bottom-forming sheet of a stock, which is designated 27 (Fig. 1), a ram 28 faced by a bottom-molding plate 29 is provided, together with actuating mechanism therefor, hereinafter described, said plate being of such size and form as slidably to fit within the side-wall-pressing plates 12, 16, 17, 22, 23 when the latter are closed tightly upon the work. $27^a, 27^a$, are pieces of stock mounted in aligned grooves in the several mandrels to provide lugs in the bottom of the jar for supporting the battery plates.

For holding the mandrels against the pressure of the ram, a mandrel-holding member 30 is pivoted at 31 upon the frame 10, said member being provided at its mandrel-receiving end with opposite, overhanging flanges 32, 32 (Fig. 1) adapted slidingly to receive from one side, and interlock with, base flanges $18^a, 18^a$ formed on the side faces of the mandrels 18 transverse to the sheets 19, while the member 30 is in an upright position, and thus to retain said mandrels in assembled relation as said mandrel-holding member is turned on its pivot to a horizontal position to lower them onto the stock-sheet 13. If desired, the mandrels may be formed near their bases with interlocking means such as dowels (not shown) as a further means of preventing their relative displacement with regard to each other. The mandrel-holding member 30 is formed with an abutment face 30ª adapted to bear against a part of the frame, at 10ª, to stop said member in substantially upright position.

For raising the hinged members 14, 15 with their face-plates 16, 17, and other parts carried thereby, into pressing position, and lowering them therefrom, a vertical fluid pressure cylinder 33 (Fig. 1) is secured under the frame 10, the upwardly extending piston rod of said cylinder (not shown) being attached to a cross-head 34, to the respective ends of which are secured slide-bars 35, 35 extending downward on opposite sides of the cylinder, through guides 36, 36 secured to the latter. 37 is a yoke surrounding said cylinder and secured at its sides to the lower ends of the slide-bars, and the ends of said yoke are connected respectively with the side-wall-pressing members 14, 15 by links or connecting-rods 38, 38. This arrangement gives the advantage of long connecting rods, avoiding large angular movement and consequent loss of mechanical advantage therein, while permitting a compact arrangement of the parts.

For forcing the uppermost folding and pressing plates 22, 23 against the work, and drawing together the plates 16, 17, the hinged member 20 which carries the plate 22 is provided with a gear-segment or rack member 39, the teeth of which, 39ª, are flanked by cam surfaces, one of which is shown at 39ᵇ (Fig. 3). The member 39 is positioned at a distance from the hinge 14ª, so as to have a substantial leverage. As here shown, the rack-member is curved substantially concentrically with the hinge 15ª of the member 21, and is so positioned that the hinge 14ª of the member 20, upon which it is mounted, lies in a tangential direction.

The member 21, which carries the plate 23, is provided with a pair of parallel, curved arms 40, 40 adapted to over-reach the gear-segment or rack member 39 when the hinged members 20, 21 are successively turned into pressing position. 41 is a hand lever pivoted at 41ª between the ends of said arms and provided at its inner end with a gear-segment member 42, the teeth of which, 42ª, are flanked by eccentric cam surfaces, one of which is shown at 42ᵇ (Fig. 3), said surfaces being curved about the center 42ᶜ.

When the gear-segment or rack member 39 is formed and positioned as shown, the teeth 42ª of the member 42 are preferably arranged concentrically with the cam surfaces 42ᵇ, so as to mesh to a uniform depth throughout the cam action.

The intermeshed teeth 39ª, 42ª are adapted to apply a strong closing force to the plate 23 throughout the relatively long movement therof necessary for the shearing of the thick sheets of stock used for the side walls of multiple-celled jars, while the cam action of the surfaces 39ᵇ, 42ᵇ applies a strong force to the member 20, turning it about its hinges, through the relatively short range represented by compression of the stock, which is already embraced between said members and the mandrels when the cam action begins. I do not wholly limit my invention, however, to the specific construction and positioning of the rack-and-pinion members and cam surfaces here shown.

For holding the lever 41 in a depressed position, with the pressing plates closed tightly upon the work, while the stock coalesces at the seams, a latching arm 43 (Fig. 2) is pivoted at 44 upon the side-wall-pressing member 14, and provided with a latch-hook 45 adapted to engage an off-set lug 46 upon the arm 41. 47 is a hinge-spring for the latching arm 43, adapted to hold the latter yieldingly in latching position.

For turning the member 20 upon its hinge, into or out of pressing position, said member is provided with a pair of hooked, overreaching arms 48, 48, extending from one of which is a handle 49, and said arms are adapted to hook over rollers 50, 50 journaled on the ends of the pivot pin 15ª of the side-pressing member 15, to retain the several pressing members, except the member 21, in closed position preparatory to the clamping action of the rack-and-pinion device 39, 42. The arms 48 may also be so formed as to limit the compressing movement of the member 20, by contact with the tops of the rollers 50, to assure uniformity in the side-wall thickness of successive jars.

The lever 41 is provided with a lateral extension 51, having at its end a spring-backed plunger 52 adapted to enter a dimple or recess 53 in a plate 54 secured to one of the curved arms 40 of the member 21, when said lever is turned out of clamping position, to hold said lever and arm in fixed relation while the member 21 is turned out of and into pressing position by means of said lever. The coacting faces of said plunger and recess may be of complemental, spherical form, as shown, or otherwise formed as preferred so that, while engaging with sufficient tenacity to turn the member 21 about its hinge, they may be automatically disengaged by further movement of the lever 41 after unitary movement of the member 21 and lever 41 is resisted by meshing of the gears 39, 42 or contact of the stock-sheet 13 with the upper face of the mandrels, the plate 22 or the member 20.

For turning the mandrel-holding member 30 about its pivot 31, to raise its mandrel-receiving end to its upright, loading and unloading position, and to lower it into pressing position, a fluid-pressure cylinder 55, formed with trunnions, is pivoted, on said trunnions, in the frame 10 at 56 (Fig. 1). The downwardly-extending piston-rod of said cylinder (not shown) is secured to a cross-head 57 joining the ends of a pair of slide-bars, one of the latter being shown at 58, said slide-bars being mounted, parallel with the cylinder, in guides carried by the cylinder on opposite sides thereof, the nearest pair of said guides being shown at 59, 59 in Fig. 1. The upper ends of said slide-bars are secured to the head of a T-shaped cross-head 60, the tail of which is pivoted at 61 to the tail of the pivoted mandrel-holding member 30, the cylinder 55 being adapted, as above described, to turn on its trunnions to permit angular movement of the slide-bars 58. The use of a connecting rod is thus dispensed with, permitting a compact arrangement of the parts.

62 is an assembling table for the mandrels, mounted upon the frame 10 adjacent the upright position of the head of the mandrel-holding member 30, said table being provided with guide flanges 63, 63 to facilitate the accurate assembling of the mandrels and partition-forming stock-sheets upon said table preparatory to being slid from said table onto the mandrel-holding member. 62ª (Fig. 2) is a similar table positioned on the opposite side of the mandrel holding member and adapted to receive the work therefrom.

For actuating the bottom-pressing ram 28, I provide a vertical cylinder 64 secured in the frame 10, the downwardly-extending piston rod of which, 65, is secured to a cross-head 66, and extends beyond said cross-head through a guide 65ª and into a guard 65ᵇ. To the ends of the cross-head 66 are pivoted, as at 66ª, a pair of links or connecting-rods, one of which is shown at 67. At their upper ends said connecting-rods are pivoted, as at 67ª, to the respective sides of a hollow or arched member 68 pivoted at its rear end to the frame 10 at 69. Said member is connected with the ram 28 by a pair of toggle-links, one of which is shown at 70, said links being pivoted at one end to respective sides of the ram, as at 71, and at their opposite ends to the inner walls of the hollow member 68, the outer end of the pivot pin of the nearer of said links being shown at 72. 73 is a guide bar for said ram, its end being set in a socket in said ram and secured therein by a pin 74, and said guide-bar is slidably mounted in a horizontal guide 75 rising from the frame 10 between the toggle links 70.

The arched member 68 and the links 70 thus constitute a toggle for forcing the face-plate 29 on the ram 28 against the bottom-forming sheet of stock 27, and retracting said plate therefrom, under action of the cylinder 64.

For supplying pressure fluid to the several cylinders I provide separate branches from an air line, each branch being provided with a hand-operated valve for controlling its respective cylinder. The fluid pressure connections for the ram-actuating cylinder 64 for example, are clearly shown in Fig. 1, where 76, at the right of the figure, represents a branch from the main line, 77 a four-way cylinder-actuating or control valve on said branch, 78 a pipe leading from said valve to the top of the cylinder 64, 79 a pipe leading from said valve to the bottom of said cylinder, and 80 an exhaust from said valve. 81 is a hand lever on said four-way valve, the latter being adapted thereby to be so turned as to connect the pipe 78 with the air line and the pipe 79 with the exhaust, or the pipe 79 with the air line and the pipe 78 with the exhaust. 82 is a ratchet for holding said lever in either of the positions suggested. 78ª and 79ª are throttling devices, for the respective pipes 78, 79, which devices may be of any known or approved construction but are here shown as a common form of adjustable double check-valve, adapted to regulate separately the flow of ingoing and outgoing air, so as to prevent violent or unduly rapid action of the ram. In combination with an actuating valve, when once adjusted, they permit full movement of the latter by a single, quick action of the operator and eliminate the necessity for manual regulation of the flow at each operation.

Similar fluid connections and controls are provided for the cylinders 33 and 55, except that, as their pistons require to be driven by fluid pressure in one direction only, the weight of connected parts being sufficient to move them in the opposite direction, a single charging pipe is required for each, and a three-way valve (not shown) is provided instead of a four-way valve. 83 is the charging pipe for the cylinder 33, running to the bottom thereof. 84 is a flexible pipe connected to the top of the cylinder 55, the flexibility of said pipe permitting said cylinder to turn on its trunnions at 56.

In the operation of the device, the cylinder 33 being exhausted, and the side-wall-pressing members opened out as indicated by dotted lines in Fig. 2, the sheet of side-wall stock 13, in flat form, is laid thereon.

Said sheet, and the sheets hereinafter mentioned, just before being placed in the machine, are heated, in any known or preferred manner, as by the use of a steam table (not shown), to a temperature sufficient, according to the character of the stock, to cause it to coalesce at the seams under the pressure applied by the machine, while leaving it sufficiently stiff to be self-sustaining upon the mandrels after the pressure is released.

The mandrel-holding member 30 being in upright position, and the set of mandrels 18 having been assembled alternately with the partition-forming sheets 19 upon the table 62, and the lug-forming strips of stock 27ᵃ having been mounted in the grooves of the assembled mandrels, and the bottom-forming sheet 27 lightly pressed thereof, said assembled mandrels, with the stock thereon as just described, are slid from said table onto the mandrel-holding member, the base flanges 18ᵃ of the mandrels sliding under and into interlocked relation with the overhanging flanges 32 of the mandrel-holding member.

The cylinder 55 is then exhausted and the mandrel-holding member 30 permitted to be turned by its own weight and that of the mandrels to lay the latter upon the sheet 13, the throttled exhaust of the cylinder 55 preventing their violent descent. As soon as the mandrels rest upon the sheet 13, the ram 29 may be actuated momentarily and withdrawn by the cylinder 64, to press the bottom-forming sheet 27 snugly against the mandrels and the lugs 27ᵃ.

Fluid pressure is then applied to the cylinder 33, raising the side-wall-pressing members 14 and folding the sheet 13 against the vertical side-faces of the mandrels. The terminal side-wall-pressing member 20 is then turned on its hinges by means of the handle 49 to the position shown in full lines in Figs. 2 and 3, to fold one end portion of the sheet 13 over onto the mandrels. The terminal side-wall-pressing member 21 is then turned on its hinges by means of the hand-lever 41, its latch-plunger 52 being engaged in the recess 53, to the position shown in full lines in Fig. 3, where the pinion-member 42 meshes with the rack member 39. By further forced movement of said lever the latch-plunger 52 is dislodged from the recess 53, the lever then turning relatively to the arms 40 on which it is pivoted, while the pinion member 42, running on the rack-member 39, draws the hinged, vertical side-wall-pressing members 14, 15 together upon the work, and forces the terminal pressing members 20, 21 toward each other and against the work. As the plate 23 passes the plate 22, it shears the excess stock 20 from the sheet 13, as illustrated in Fig. 2; and by its further movement, with the high degree of pressure afforded by the rack-and-pinion arrangement shown, unites the terminal edges of the stock sheet shown, causing them so to coalesce that the jar subsequently may be vulcanized without a mold, as in the open steam method, without undue weakness of the seam resulting.

The first-laid terminal edge of the stock sheet 13 preferably is beveled, as shown in Fig. 3, and the sheet is positioned originally upon the opened-out pressing members that when folded about the mandrels as described said edge will lie with the heel of its bevel approximately at the edge of the plate 22, as shown (Fig. 3).

While the pressure is thus applied to the side wall stock, the ram 28, with its face plate 29, is forced against the bottom of the jar with great pressure, through the action of the power cylinder 64 and the toggle 68, 70, causing the bottom-forming sheet 27 to coalesce with the lug-forming strips 27ᵃ and the side-wall stock 13, so that, as in the case of the seam above referred to, the bottom seams do not require a mold during vulcanization to avoid weakness. I find it preferable in practice, in assembling the stock, to have the side-wall sheet 13 extend past the bottom-forming sheet 27, rather than to have its edge face abut the broad face of the latter, in order that the side-wall stock may be folded as described without sliding movement with respect to the bottom forming sheet.

After holding the pressure on the side walls and bottom of the jar for a sufficient time to permit coalescing of the sheets, the ram is withdrawn, the side-wall-pressing members opened out by reversal of the operations above described, the mandrel holding member 30 is raised by the cylinder 55, the work slid therefrom onto the table 62ᵃ, and the operation repeated.

My improved apparatus is not only adapted for rapid, easy and uniform operation with respect to jars of different types, but also to produce a multiple-celled jar which may be vulcanized without an outer mold, the combination of the mandrels and the mandrel holding member being such that said mandrels may readily be assembled with the holder and securely held in assembled relation while being moved into pressing position.

In the method described, the coalescing of the seams is quickly accomplished and is substantially uniform throughout, since the transverse pressure is simultaneously applied to all parts of the work and, through the plasticity of the stock, tends to distribute or equalize itself in all of the seams or joints of the jar. Nevertheless the stock, at the temperature employed, is sufficiently firm to retain its form and be self sustaining upon the mandrels, and to withstand handling although associated with a plurality of heavy mandrels. The stock having been thoroughly coalesced and formed to the mandrels, the final step of vulcanizing may be had without further molding pressure.

The apparatus may be modified within the scope of my invention and I do not desire to limit said invention except as defined in the appended claims or required by the prior art.

I claim:

1. Apparatus for making a multiple-celled container from plastic material, said apparatus comprising a set of mandrels adapted to be assembled alternately with partition-forming sheets of said material, means for wrapping a side-wall-forming sheet of said material about said mandrels and sheets, and means for simultaneously pressing said side-wall-forming sheet and said partition forming sheets upon said mandrels.

2. Apparatus for making a multiple-celled container from plastic material, said apparatus comprising a set of mandrels adapted to be assembled alternately with partition-forming sheets and to receive a bottom-forming sheet of said material, means for wrapping a side-wall-forming sheet about said mandrels and sheets, and means for applying transverse molding pressure to all of said sheets while the latter are so associated with said mandrels.

3. Apparatus for making a multiple-celled container from plastic material, said apparatus comprising a set of mandrels adapted to mold respective cells of said container, a mandrel-holding member adapted to receive said set of mandrels and to interlock with the base portions thereof to carry them in assembled relation into molding position, means for confining the side walls of a container mounted on said mandrels, and means for pressing the bottom of said container against said mandrels.

4. Apparatus for making a multiple-celled container from plastic material, said apparatus comprising a set of mandrels adapted to mold respective cells of said container, a pivoted mandrel-holding member having, in loading position, a substantially horizontal face adapted slidingly to receive, from a direction substantially parallel with the pivotal axis of said member, the successive mandrels of said set, means for holding said mandrels in assembled relation on said member as the latter is turned to molding position, and means for applying molding pressure to the exterior of a container mounted on said mandrels.

5. In apparatus for making a multiple-celled container from plastic material, the combination of a set of mandrels adapted to mold the respective cells of said container and to be assembled alternately with partition-forming sheets of stock in the building of said container, projecting base-flange members on the faces of said mandrels transverse to said sheets, a pivoted mandrel holding member having, in loading position, a substantially horizontal face adapted to receive said mandrels, and an overhanging flange-member or members, on said holding member, adjacent said horizontal face, adapted to interlock with the base-flange members of said mandrels.

6. In apparatus for making a multiple-celled container from plastic material, the combination of a set of mandrels adapted to mold the respective cells of said container, a pivoted mandrel-holding member having, in loading position, a substantially horizontal face adapted slidingly to receive said mandrels, interlocking means on said holding member and said mandrels, and a table-member whose surface lies substantially in the same plane and adjacent to the horizontal face of said holding member.

7. Apparatus for making a multiple-celled container from plastic material, said apparatus comprising a set of mandrels adapted to mold respective cells of said container, means abutting the bases of said mandrels for holding them against molding pressure, means for confining the side walls of a container mounted on said mandrels, a bottom pressing member, and a toggle for driving said bottom-pressing member.

8. Apparatus for making a multiple-celled container from plastic material, said apparatus comprising a set of mandrels adapted to mold respective cells of said container, means abutting the bases of said mandrels for holding them against molding pressure, a set of hinged members adapted to be closed and clamped about said mandrels to press the side walls of a container mounted thereon, a bottom pressing member, and a power member for driving said bottom pressing member.

9. Apparatus for making a container from plastic material said apparatus comprising a hinged pressing member having gear or rack teeth and a cam surface in fixed relation thereon, a second hinged pressing member adapted to coact with the first in a shearing action, and a member pivoted on said second pressing member and having gear or rack teeth and a cam surface in fixed relation thereon adapted to engage the teeth and cam surface on said first pressing member.

10. Apparatus for making a container from plastic material said apparatus comprising a hinged pressing member having gear or rack teeth and a cam surface in fixed relation thereon, a second hinged pressing member adapted to coact with the first in a shearing action, and a member pivoted on said second pressing member and having gear or rack teeth and a cam surface in fixed relation thereon adapted to engage the teeth and cam surface on said first pressing member, said teeth and the cam surface of said pivoted member being arranged eccentrically with regard to its pivot.

11. Apparatus for making a container from plastic material, said apparatus comprising one or more mandrels, a set of hinged side-walls pressing members adapted to be closed upon a container mounted upon said mandrel or mandrels, and a rack-and-pinion device, the toothed elements thereof being mounted upon respective terminal members of said set, for clamping the latter upon the work.

12. In apparatus of the character described, the combination of means for internally molding a container, a set of hinged side-wall-pressing members, adapted to be closed upon a container mounted upon said internal molding means, a rack member mounted upon one of the terminal members of said set, a lever pivoted on the other terminal member of said set, and a pinion member mounted on said lever eccentrically with respect to the pivot of the latter and adapted to coact with said rack member to clamp said side-wall-pressing members against the work.

13. In apparatus of the character described, the combination of means for internally molding a container, a set of hinged side-wall-pressing members adapted to be closed upon a container mounted upon said internal molding means, a rack-and-pinion device, the respective toothed elements thereof being mounted on respective terminal members of said set, for clamping the latter upon the work, a lever pivoted on one of said terminal members and adapted to turn the pinion member of said device, and a latch member for holding said lever in clamping position.

14. In apparatus of the character described, the combination of means for internally molding a container, a set of hinged side-wall-pressing members adapted to be closed upon a container mounted upon said internal molding means, a rack-and-pinion device, the respective toothed elements thereof being mounted on respective terminal members of said set, for clamping the latter upon the work, a lever pivoted on one of said terminal members and adapted to turn the pinion member of said device, and a spring-backed member mounted on said lever and adapted yieldingly to engage in a recess on the terminal member on which said lever is pivoted and to be unseated from said recess by application of clamping force to said lever.

15. In apparatus for making a container from plastic material, the combination of means for internally molding said container, a lower mold member adapted to support a sheet of side-wall stock with said internal molding means thereon, a pair of side-wall-pressing members hinged to said lower mold member and adapted to be swung on their hinges against respective sides of the work, a fluid pressure cylinder, and a pair of connecting rods respectively pivoted on said hinged members and adapted to be actuated by said cylinder to raise said hinged members into pressing position.

16. In apparatus for making a container from plastic material, the combination of means for internally molding said container, a set of mold members hinged together, the set being adapted to be wrapped about a sheet of side-wall stock on said internal molding means, a lever device pivoted on one terminal member of said set, means on the other terminal member of said set adapted to be engaged by said lever device for tightening the set of members upon the work, and means adapted to secure said lever device in fixed relation to the terminal member upon which it is mounted for turning the latter upon its hinge by means of said lever device, and adapted to be released to permit turning of said lever device upon its pivot for the tightening of the set of members upon the work.

In witness whereof I have hereunto set my hand this 15 day of March, 1922.

HARRY E. WANER.